United States Patent [19]
Fehrenbach et al.

[11] Patent Number: 6,097,346
[45] Date of Patent: Aug. 1, 2000

[54] ANTENNA FOR A RADAR UNIT FOR LEVEL MEASUREMENT

[75] Inventors: Josef Fehrenbach, Haslach; Juergen Motzer, Offenburg; Fritz Lenk, Schramberg, all of Germany

[73] Assignee: Vega Grieshaber KG, Wolfach, Germany

[21] Appl. No.: 09/056,943

[22] Filed: Apr. 8, 1998

[30] Foreign Application Priority Data

Nov. 28, 1997 [DE] Germany ............................ 197 52 808

[51] Int. Cl.$^7$ ...................................................... H01Q 1/24
[52] U.S. Cl. ............................ 343/785; 343/906; 343/715
[58] Field of Search .................................. 343/785, 788, 343/715, 772, 906, 702, 908

[56] References Cited

U.S. PATENT DOCUMENTS

| | | | |
|---|---|---|---|
| 3,806,942 | 4/1974 | Preti .......................................... | 343/702 |
| 4,053,897 | 10/1977 | Nerheim ................................... | 343/785 |
| 4,210,793 | 7/1980 | Fournet-Fayas ................. | 219/10.55 A |
| 5,325,104 | 6/1994 | Harada et al. ........................... | 343/715 |
| 5,502,452 | 3/1996 | Gomez ..................................... | 343/715 |

*Primary Examiner*—Don Wong
*Assistant Examiner*—James Clinger
*Attorney, Agent, or Firm*—Foley, Hoag & Eliot LLP

[57] ABSTRACT

An antenna for a radar unit for level measurement has a dielectric rod radiator for radiating microwaves in a main radiation direction. A coupling sleeve is provided with an external thread for installation by screwing into a holder opening. The coupling sleeve contains an at least partially approximately hollow cylindrical inner part made of dielectric material that projects in the main radiation direction out of coupling sleeve. A hollow guide system includes an HF coupling device and hollow guide tube that is received in an inner part. As viewed in the main radiation direction, the rod radiator is located releasably or permanently at the forward end of the inner part.

19 Claims, 3 Drawing Sheets

ANTENNA FOR A RADAR UNIT FOR LEVEL MEASUREMENT

BACKGROUND OF THE INVENTION

1. Field of the Invention

The invention relates to an antenna for a radar unit for level measurement and more particularly to an antenna for a radar unit for level measurement with a hollow guide system and dielectric rod radiator.

2. Description of Related Art

Antennas for level measurement devices that operate using microwaves have been known for some time and are used for continuous level measurement of both liquids and poured goods, for example. The measurement principle is based on transmitting short microwave pulses from a high frequency radiator (HF radiator). In a combined transmission and reception system, the pulses reflected from the contents are detected and the travel time of these pulses is measured to determine the distance to the contents.

The coupling of microwaves inside the container is accomplished by means of a suitable HF radiator. It is desirable to make sure that no temperature or corrosion sensitive components of the antenna are located in the container.

When using such level-measuring devices that operate with microwaves, it is necessary to guarantee a good seal between the interior of the container and the electronic part of the antenna. This is especially important when the level in containers such as industrial tanks is to be determined, in which overpressures or vacuums prevail at high or low operating temperatures and the container holds explosive and/or highly corrosive and/or toxic media. Consequently, the antenna should be designed to be as resistant as possible to temperature, pressure, and corrosion. Moreover, the antenna should conform to the regulations governing approval for use in facilities where there is a risk of explosion. It is useful if the antenna conforms to the harmonized European standards "Electrical Operating Media for Explosion-Risk Areas" and ElexV Ex-Zone 0 as well as Ex-Zone 1. Ex-Zone 0 covers areas in which dangerous explosive vapors are present constantly or for a long time, while Zone 1 covers areas in which dangerous explosive vapors are to be expected to occur occasionally.

High-gain antennas are used to direct microwaves, bundled as tightly as possible, against the surface of the contents. In this case, the divergence, i.e. the aperture angle, of an antenna beam is inversely proportional to its size/wavelength ratio. As a result, at a given wavelength and with various design boundary conditions, aperture angles from several degrees to approximately 40° constitute dimensions that are in conventional use.

A dielectric rod radiator is a type of antenna that is frequently in use in level measurement using microwaves because of its high resistance to chemicals. Dielectric rod radiators and their function are described, for example, in the publication "IEEE Transactions on Antennas and Propagation," Volume AP-30, No. 1, January 1982, pp. 4–58. Dielectric rod antennas consist essentially of a hollow guide into which HF energy is fed by a suitable HF-coupling device and at whose end a preferably tapering rod made of dielectric material is located.

A dielectric rod antenna of this kind is shown in German patent application 94 12 243.1 of the Applicant, and is intended especially for use in a radar device for level measurement. High resistance to chemicals, resistance to pressure, and resistance to corrosion are achieved by virtue of the fact that the dielectric rod antenna is coated on its side facing the container with a corrosion-resistant protective layer that is permeable to electromagnetic waves, preferably a layer of enamel, plastic, or ceramic. This known design permits mounting the dielectric rod antenna in relatively thin tubular stubs while maintaining the required small aperture angle.

It has been found that the previous design and assembly expenses for dielectric rod antennas of this type used for level measurement, especially as far as mounting on a container is concerned, are relatively high and therefore cost-intensive. Specifically, a conventional rod antenna uses a flange of its own with bolt openings provided therein for bolting it to a matching flange on the container lid that is especially provided for that purpose. When the rod antenna is installed, it is attached in a fixed position on the container and therefore can not be rotated relative to the container. This is particularly problematic if it is determined after installation that the rod antenna should be rotated around its own lengthwise axis to filter out disturbing echoes.

It is desirable to improve on the known antenna for a radar unit used for level measurement and equipped with a dielectric rod radiator such that the antenna can be mounted more simply on a container and hence an antenna that costs less to mount can be used.

SUMMARY OF THE INVENTION

The present invention uses a coupling sleeve with an external thread for a mounting device that mounts a container opening by screwing. The coupling sleeve has an at least partially approximately hollow cylindrical internal part made of dielectric material that projects in the main radiation direction from the coupling sleeve. The hollow guide system with an HF coupling device and a hollow guide tube is located inside. The rod radiator is located at the front end of the inner part, as viewed in the main radiation direction.

By providing a suitable external thread, it is possible in simple fashion to secure the entire antenna to a threaded bushing or to a flanged opening with an internal thread in a container wall. A 1½ inch thread, for example, may be provided as the external thread.

The antenna according to the present invention is characterized by ease of manufacture together with simple mounting ability. In addition, the antenna, because of the dielectric rod radiator provided, is highly resistant to chemicals and therefore can also be used for measuring corrosive contents.

In an embodiment of the invention, the inner part, secured in the coupling sleeve, is mounted so that it can be rotated around its own lengthwise axis. This provides the advantage of allowing the polarization direction of the preferably linearly polarized high-frequency waves that are emitted to be changed after the antenna has been mounted by rotating the inner part instead of rotating the hollow guide system. This is especially advantageous when initial test measurements following installation indicate that undesirably high disturbing echoes are occurring. By rotating the inner part together with the hollow guide system, a position can be found in which the disturbing echoes are minimized or even eliminated. Therefore, the above mentioned ability to be rotated ensures improved characteristics of the received signal.

If the inner part is made rotatable with respect to the threaded sleeve and consequently is designed as a separate part, a sealing device, composed, for example, of two sealing rings, is advantageously located between the opposite outside wall of the inner part and the inside wall of the threaded sleeve.

However, it is also possible for the inner part and the threaded sleeve to be made in one piece. In that case, the polarization direction may be changed if the hollow guide system (i.e., the HF coupling device located in the central opening of the inner part) is rotated around its lengthwise axis together with the hollow guide tube.

Another improvement of the present invention provides that the hollow guide tube of the hollow guide system likewise extends in the principal radiation direction beyond the coupling sleeve. This has the advantage of ensuring an improved radiation characteristic for the antenna. If the leading edge of the hollow guide tube projects through the mounting stub of the container into the interior of the container and thus necessarily beyond the coupling sleeve as well, no disadvantageous change in the antenna characteristic is caused by the mounting.

The HF coupling device advantageously has a pot-shaped metal jacket that is open in the principal radiation direction, the jacket being preferably filled with dielectric material. An opening is made in the side wall of the metal jacket, through which opening an HF exciting pin electrically connected with a lead projects radially relative to the main radiation direction into the dielectric material. Advantageously, the electrical lead to the exciting pin is in the form of a plug connection, with a plug and socket. The HF coupling device therefore is surrounded by both the coupling sleeve and the inner part in an annular fashion. As a result, in contrast to conventional antennas with dielectric rod radiators, no influence is exerted on the HF coupling device by the mounting in a container stub.

In a preferred embodiment, the coupling sleeve is plastic while the dielectric rod radiator and/or the inner part are made of dielectric materials, for example polystyrene, polypropylene, or polytetrafluoroethylene (PTFE), or of a mixture of these materials.

The hollow guide tube embedded in the interior is made, for example, of a metal tube with a lid, filled with a dielectric. Alternatively, a metallized plastic rod can also be used for the purpose. The hollow guide tube can be filled with air or with a dielectric.

In an embodiment of the present invention, the hollow guide tube has at its forward end a mode slot mounted on the hollow guide tube. This mode slot is located in an area of the wall of the hollow guide tube that projects from the coupling sleeve in the main radiation direction. The mode slot is preferably machined orthogonally to the main radiation direction in the wall of the hollow guide tube. This mode slot improves antenna adjustment, so that so-called undesired "phantom" echoes are avoided or at least reduced.

The mode slot is located orthogonally to the polarization direction of the antenna. With correct dimensioning, it prevents the development of higher modes in the hollow guide without itself being excited and caused to radiate by the fundamental wave. The decay pattern of the antenna and hence the measurement reliability in the near field is considerably improved by a mode slot of this kind.

In an embodiment of the invention, the rod radiator and the interior are made in one piece. However, it is also possible to mount the rod radiator using a releasable connection (e.g., a screw connection) to the inner part.

The hollow guide system of the antenna may be connected to an HF supply cable. In order to avoid having also to provide a potential equalization line when installing the level-measuring device, this connection is not connected with the container potential. In the antenna according to the present invention, this is facilitated by virtue of the fact that the coupling sleeve and the inner part are made of materials that are not electrical conductors. The hollow guide system and/or the hollow guide tube is/are therefore insulated from the container all the way around by an insulating layer formed by the inner part and the coupling sleeve. In order to be able to use the antenna even in areas where there is an explosion hazard, the rod radiator may be provided with a coating that is an electrical conductor.

The antenna according to the invention will now be described in greater detail, with three figures showing two embodiments.

DETAILED DESCRIPTION OF THE PREFERRED EMBODIMENTS

In the figures below, the same reference numbers refer to the same parts and have the same meanings unless otherwise stated.

Figure 1:
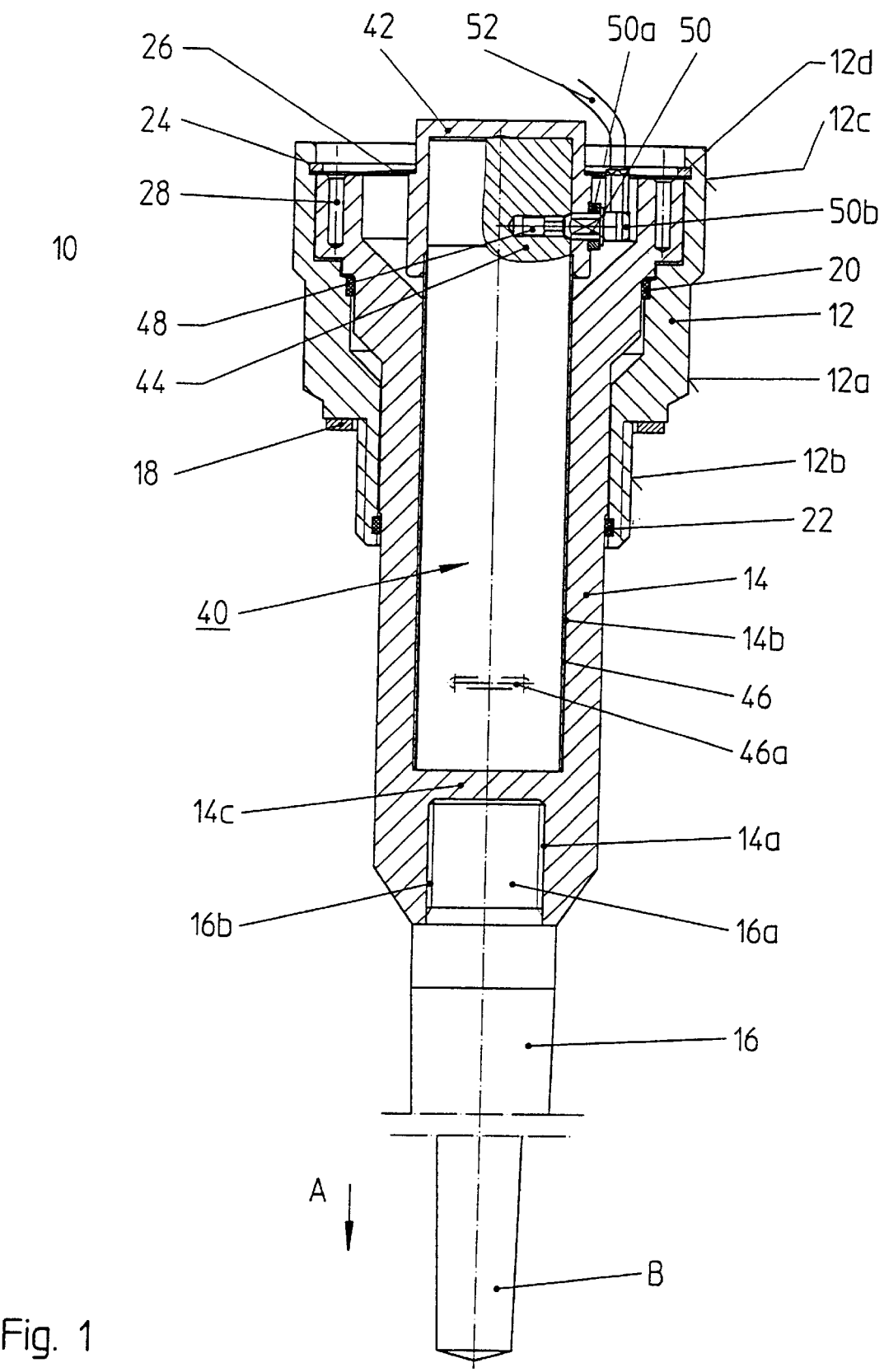
FIG. 1 is a sectional view of a first embodiment of an antenna according to the present invention.

Referring to FIG. 1, an antenna 10 for a radar unit used for level measurement is shown in a lengthwise section along a main radiating direction A. The antenna 10 has a coupling sleeve or union nut 12, whose outside diameter, as viewed from above, extends downward in stages in the main radiation direction A of the antenna 10. The coupling sleeve 12 has a center portion 12a, a reduced portion 12b that joins at a bottom portion of the coupling sleeve 12, and a third portion 12c that is wider and is attached at a top portion of the coupling sleeve 12. An outside wall of coupling sleeve 12 that is provided in the center portion 12a may have a polygon shape, for example a hexagon. In the lower portion 12b, an outside wall may have an external thread. The outside wall corresponding to the third portion 12c may have a smooth annular form, for example. As described in detail below, the external thread of the lower portion 12b allows the antenna 10 to be screwed easily into a threaded stub or a flanged opening of a container. A screwdriver may be used on the middle portion 12a to facilitate this assembly. The coupling sleeve 12 is made of metal or of a material that is not an electrical conductor, such as a plastic. Suitable plastics include polystyrene, polypropylene, or polytetrafluoroethylene, for example, or a mixture of these materials. When installing the antenna 10, a sealing ring 18 may be applied to the annular edge that projects from the middle portion 12a toward the lower portion 12b to provide a sealing connection to the container.

Inside the coupling sleeve 12 is an at least partially approximately hollow cylindrical tubular inner part 14 and a hollow guide system 40 that is secured internally by the inner part 14. The inner part 14 is made of a dielectric material, polystyrene, polypropylene, or polytetrafluoroethylene for example, or a mixture of these materials. A pair of sealing rings 20, 22 may be provided between an outside wall of the inner part 14 and an inside wall of coupling sleeve 12. The sealing rings 20, 22 may be spaced axially with respect to one another in the main radiation direction A.

The sealing ring 20 is located approximately at a level of the transition between the center portion 12a and the third portion 12c of the coupling sleeve 12. The sealing ring 22 is located toward a lower portion of coupling sleeve 12.

The inner part 14 is substantially tubular and has two opposing central openings 14a, 14b that are separated by a partition 14c that is substantially orthogonal to the main radiation direction A. In one embodiment, the inner part 14 is approximately twice as long as the coupling sleeve 12 and a lower portion of the inner part 14 projects from the coupling sleeve 12. In the embodiment illustrated in FIG. 1, the opening 14b is significantly longer than the opening 14a. The hollow guide system 40, which is described in detail below, is placed in the opening 14b.

The inner part 14 fits inside an inner contour of the coupling sleeve 12 so that portions of the inner part 14 rest on portions of the coupling sleeve 12 when inner part 14 is completely inserted into the coupling sleeve 12. For the embodiment of FIG. 1, when the inner part 14 is inserted into the coupling sleeve 12, the outside wall of the coupling sleeve 12 projects slightly beyond a top portion of the inner part 14 at an upper end of the antenna 10.

The inner part 14 is secured and rotatably mounted in the coupling sleeve 12. For this purpose, a cup spring 26 abuts the upper portion of inner part 14. The spring 26 has a relatively large central opening through which a metal jacket 42 of the hollow guide system 40 projects, as explained in more detail below. The spring 26 also has smaller openings through which bolts can be guided in bores 28 at the upper portion of the inner part 14. An inner edge of the cup spring 26 abuts an annular groove of the metal jacket 42 of the hollow guide system 40. An outer edge of the cup spring 26 is accommodated in a groove 12d at the inside wall of the coupling sleeve 12. The cup spring 26 is held in place by a spring ring 24 that fits in the groove 12d of the coupling sleeve 12.

The metal jacket 42 of the hollow guide system 40 is pot-shaped and has an opening that points in the main radiation direction A. The metal jacket 42 is annular and sealed by a lid part. The inside diameter of the metal jacket 42 roughly corresponds to the diameter of the opening 14b of the inner part 14. The lid part of metal jacket 42 projects slightly beyond the upper portion of the coupling sleeve 12. The side wall of the metal jacket 42 extends in the main radiation direction A approximately up to a lower end of the upper portion 12c of the coupling sleeve 12. The metal jacket 42 may be filled with a dielectric material 44. The metal jacket 42 may be made from a variety of metals, such as brass.

A hollow guide tube 46 extends from the metal jacket 42 downward in the main radiation direction A for the entire length of the opening 14b of the inner part 14. The hollow guide tube 46 may also be filled with a dielectric material. However, it is also possible for the hollow guide tube 46 to be filled only with air.

Figure 2:
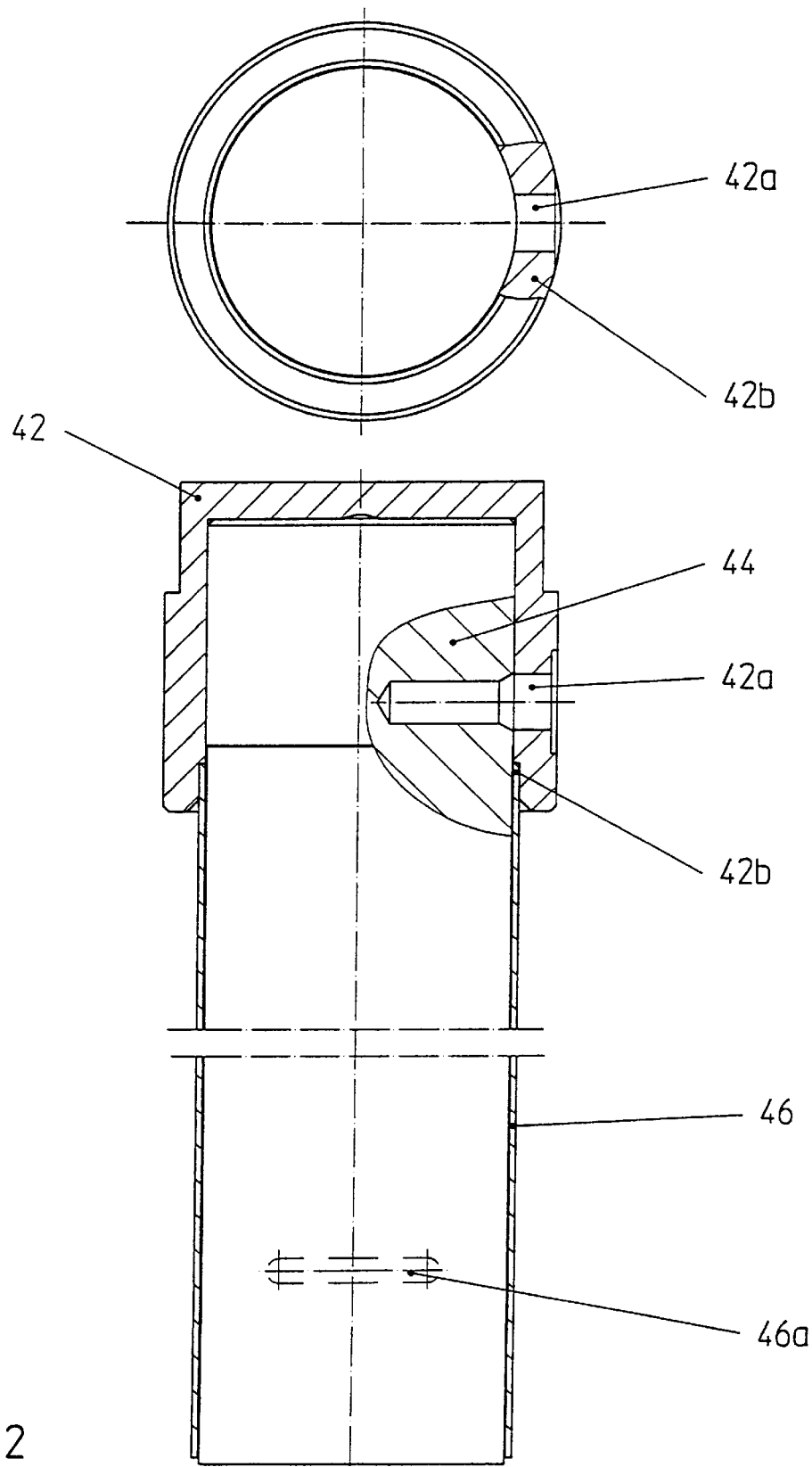
FIG. 2 shows details of the hollow guide system provided in the antenna of FIG. 1.

An exciting pin 48 is provided to couple HF energy into the antenna 10. In the embodiment of FIG. 1, the pin 48 projects into the dielectric material 44 of the metal jacket 42 in a radial direction with respect to the main radiation direction A. For this purpose, the metal jacket 42 may have a matching opening 42a, as shown in FIG. 2. The exciting pin 48 may be connected at an end thereof located outside the metal jacket 42 by a plug connection 50 to an HF supply cable 52. The plug connection 50 may be designed so that the exciting pin 48 is equipped with a sleeve 50a and the end of HF supply cable 52 is provided with a matching plug 50b.

As shown in the embodiment of FIG. 1, with the exception of the lid part of metal jacket 42, the entire hollow guide system 40 is located inside the inner part 14. The exciting pin 48 and associated plug connection 50 are surrounded by both the inner part 14 and the coupling sleeve 12. In particular, the hollow guide tube 46 projects beyond the end of coupling sleeve 12. As a result, advantageously by comparison with conventional antennas, there is little influence caused by mounting inside a container stub.

The hollow guide system 40 may be premounted as a unit and installed in the inner part 14 only when the antenna 10 is mounted. The hollow guide system 40 is rotatably mounted inside the inner part 14. The hollow guide tube 46 rests on an annular groove 42b located on the inside wall of the metal jacket 42 (see FIG. 2). A mode slot 46a is machined at a lower end of hollow the guide tube 46. The slot 46a may be located in a wall of the hollow guide tube 46 and orthogonally to the main radiation direction A. This also means that the mode slot 46a is located at 90° to the polarization of the emitted HF waves. The mode slot 46a may be dimensioned so that it prevents development of higher modes within hollow guide tube 46 when electromagnetic waves are being radiated, without being excited by the fundamental wave and thus causing undesirable radiation. The decay pattern of the antenna 10, and hence the measurement safety in the near range, are improved as a result.

A dielectric rod radiator 16 is screwed into the opening 14a of the inner part 14. The radiator 16 may be polystyrene, polypropylene, polytetrafluoroethylene, or a mixture of these materials. For this purpose, the opening 14a may have an internal thread and the rod radiator 16 may have an external thread 16b on a screwing in portion 16a of the rod 16.

Figure 3:
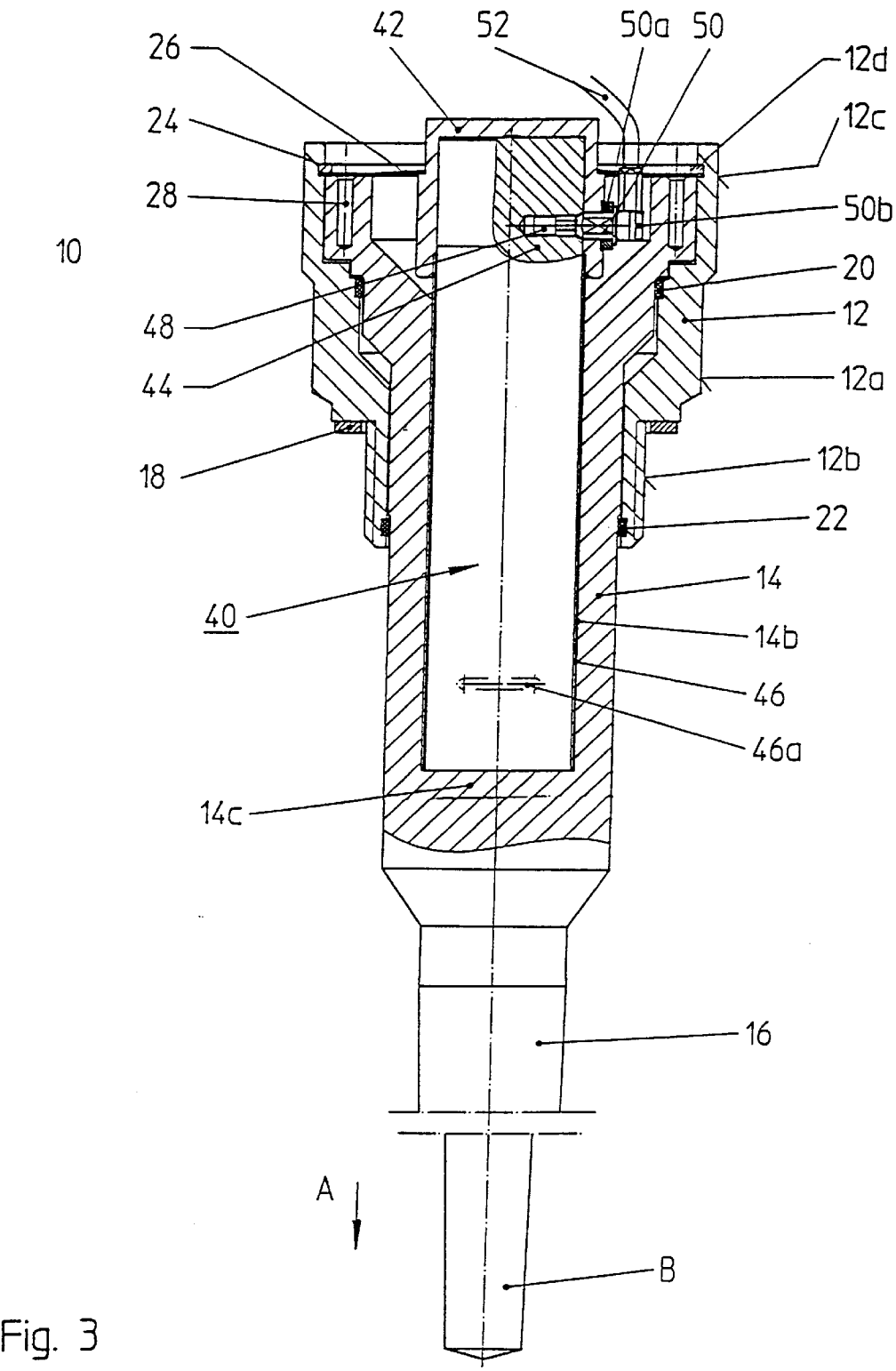
FIG. 3 is a sectional view similar to FIG. 1, showing a second embodiment of the present invention.

As an alternative to the two-piece design having the inner part 14 and the rod radiator 16 shown in FIG. 1, it is possible to form the rod radiator 16 integrally with the inner part 14, as shown in FIG. 3. In some instances, however, the two piece design may be easier to manufacture and maintain.

In order to be able to use the antenna 10 in areas with an explosion hazard, the rod radiator 16 and the inner part 14 may be coated with conductive materials on their respective outside walls.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

We claim:

1. An antenna for a radar unit used for level measurement of a container, comprising:

a substantially elongated inner part having a hollow wave-guide for guiding electromagnetic HF energy therein;

a dielectric rod radiator, coupled to a first end of said inner part to transmit the HF energy between said rod radiator and said hollow wave-guide;

an HF coupling device, coupled to a second end of said inner part opposite to said first end; and a coupling sleeve having an interior portion adapted to sealingly accept said inner part and an exterior portion, wherein said exterior portion and said dielectric rod radiator can be sealingly inserted into the container.

2. An antenna, according to claim 1, wherein said inner part is configured to rotate about a lengthwise axis thereof when placed in said coupling sleeve.

3. An antenna, according to claim 1, further comprising: two sealing rings disposed between an outside wall of said inner part and an inside wall of said coupling sleeve.

4. An antenna, according to claim 1, wherein said hollow wave-guide extends beyond said coupling sleeve in a main radiation direction.

5. An antenna, according to claim 1, wherein said HF coupling device includes a pot-shaped metal jacket, open in a main radiation direction, said jacket having an opening provided in a side wall thereof through which an exciting pin is provided for radiating the HF energy into the hollow wave-guide, said pin connectable to an HF supply feed and projecting into said metal jacket in a direction that is radial with respect to the main radiation direction, said HF coupling device being at least partially annularly surrounded by both said coupling sleeve and said inner part.

6. An antenna, according to claim 1, wherein said coupling sleeve is made of plastic or metal.

7. An antenna, according claim 1, wherein at least one of said rod radiator and said inner part is made of at least one of: polystyrene, polypropylene, and polytetrafluoroethylene.

8. An antenna, according to claim 1, wherein said coupling sleeve includes an external thread.

9. An antenna, according to claim 1, wherein an external portion of said coupling sleeve is polygon shaped.

10. An antenna, according to claim 1, further comprising:
at least one mode slot disposed in a wall of said hollow guide corresponding to a portion of said inner part that projects out of said coupling sleeve in a main radiation direction.

11. An antenna, according to claim 10, wherein said mode slot is orthogonal to a main radiation direction.

12. An antenna, according to claim 1, wherein said inner part and said coupling sleeve are a single integral piece.

13. An antenna, according to claim 1, wherein said rod radiator and said inner part are a single integral piece.

14. An antenna, according to claim 1, wherein said rod radiator is coupled to said inner part in a releasable fashion.

15. An antenna, according to claim 14, wherein said rod radiator is coupled to said inner part by screwing.

16. An antenna, according to claim 1, wherein said hollow guide is one of: a metal tube and a nonmetallic tube coated with a metal layer.

17. An antenna, according to claim 1, wherein said hollow guide contains one of: air and a dielectric material.

18. An antenna, according to claim 1, wherein said rod radiator has an electrically conducting coating.

19. An antenna, according to claim 1, wherein said inner part comprises a partition disposed between the first end and the second end of said inner part.

* * * * *